UNITED STATES PATENT OFFICE.

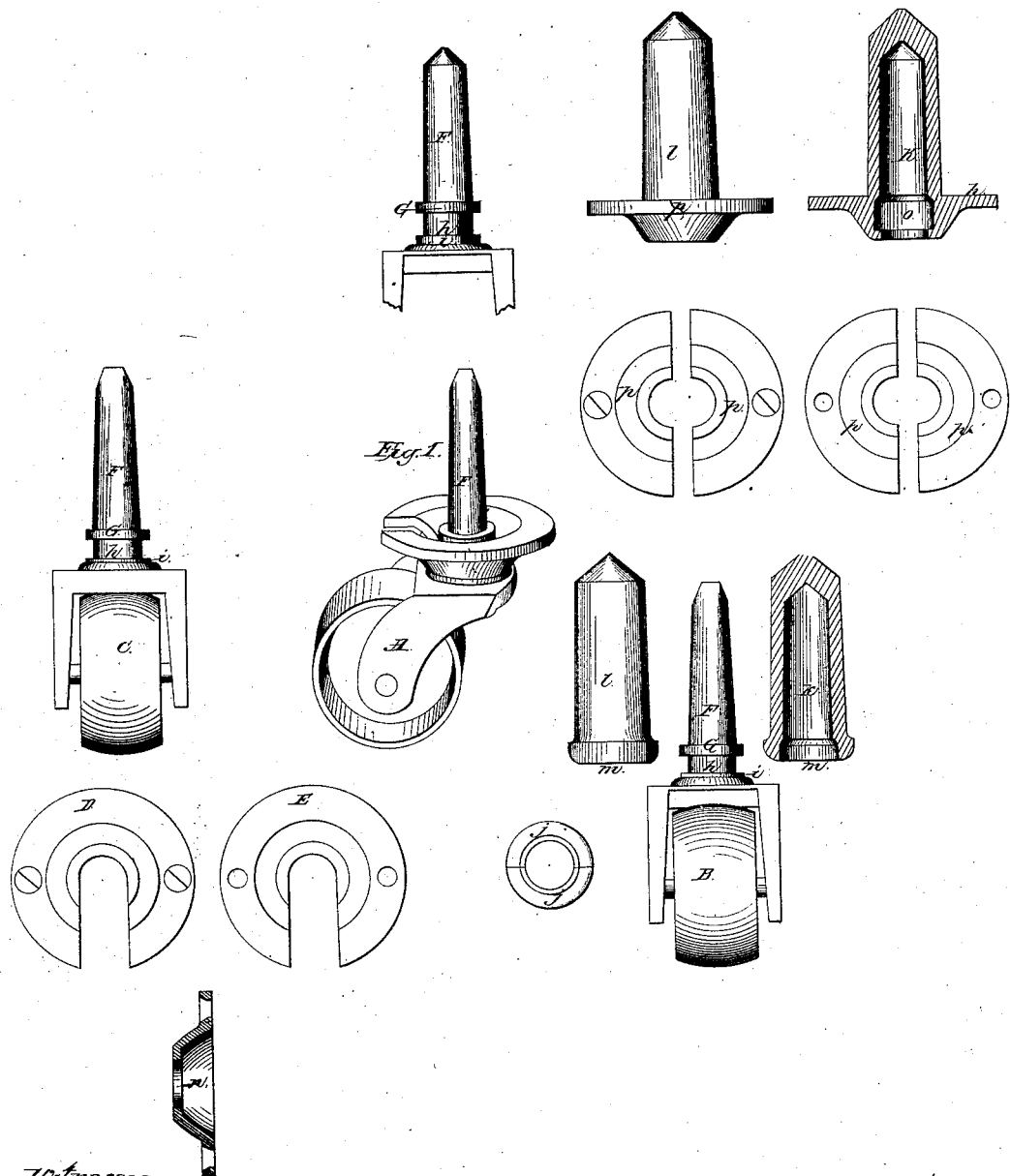

WILLIAM JOHNSON, OF MILWAUKEE, WISCONSIN.

IMPROVED CASTER FOR FURNITURE.

Specification forming part of Letters Patent No. 55,665, dated June 19, 1866.

*To all whom it may concern:*

Be it known that I, WILLIAM JOHNSON, of the city and county of Milwaukee and State of Wisconsin, have invented a new and useful Improvement on a Furniture-Caster; and I do hereby declare that the following is a full, clear, and exact description of the construction and operation of the same, reference being had to the annexed drawings, making a part of this specification, in which—

Figure 1, Letter A, is the perspective view of the caster; B, the front view; C, the back view; D, slotted rose-plate securing the stem of caster in place; E, reverse side of rose-plate; F, stem of caster; G, collar. $h$ is a chamber in stem between the collar and shoulder, in which the stem and collar revolve. $i$ is a shoulder on the stem, on which the rose-plate rests when the caster is in position. $j$ is a thimble for stem of caster; $k$, the inside of thimble, showing the concavity in which the stem of the caster revolves; $l$, the outside of thimble; $m$, the bottom end of thimble, in two parts, forming the one part. $n$ is a section of rose-plate; $o$, the chamber in the thimble on which the collar and stem revolve; $p$, the rose-plate and thimble connected, the two parts forming the thimble.

The invention consists in the use of the slotted rose-plate and the thimble, or the rose and thimble connected and in one or more parts. The collar, shoulder, and chamber will allow of the rotary motion of the caster, and securing the same in place, as desired.

What I claim as my invention, and desire to secure by Letters Patent, is—

1. The combination of the rose-plate D, in one or more parts, the chamber $h$, and the collar G, for the purpose described.

2. The shoulder $i$, in combination with the rose-plate D, thimble $l$, collar G, and chamber $h$, substantially as shown and described, and for the purpose set forth.

WILLIAM JOHNSON.

Witnesses:
G. W. MYGATT,
F. B. HAMILTON.